(12) United States Patent
Schroeder et al.

(10) Patent No.: US 6,341,129 B1
(45) Date of Patent: *Jan. 22, 2002

(54) TCP RESEGMENTATION

(75) Inventors: Theodore Schroeder, San Jose; John Hayes, Santa Cruz; Wayne Hathaway, Sunnyvale, all of CA (US)

(73) Assignee: Alteon Networks, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,031

(22) Filed: Apr. 3, 1998

(51) Int. Cl.$^7$ .............................. H04L 12/28; H04J 3/24
(52) U.S. Cl. ...................... 370/354; 370/389; 370/471; 370/474
(58) Field of Search ................................. 370/216, 217, 370/218, 352, 353, 354, 397, 389, 392, 401, 465, 466, 469, 474, 470, 471, 496, 476, 477, 490, 229, 230; 709/232, 239

(56) References Cited

U.S. PATENT DOCUMENTS

| | | | | |
|---|---|---|---|---|
| 5,065,398 A | * | 11/1991 | Takashima | 370/230 |
| 5,430,727 A | * | 7/1995 | Callon | 370/401 |
| 5,568,477 A | * | 10/1996 | Galand et al. | 370/229 |
| 5,715,250 A | * | 2/1998 | Watanabe | 370/395 |
| 5,793,983 A | * | 8/1998 | Albert et al. | 709/239 |
| 5,805,822 A | * | 9/1998 | Long et al. | 709/232 |
| 5,818,842 A | * | 10/1998 | Burwell et al. | 370/397 |
| 5,889,777 A | * | 3/1999 | Miyao et al. | 370/466 |
| 6,038,231 A | * | 3/2000 | Dolby et al. | 370/474 |

OTHER PUBLICATIONS

William Stallings, "Data and Computer Communications" pp. 136–139, 1985.*
Internet Protocol, Darpa Internet Program, Protocol Specification, Sep. 1981.
J.Postel, Internet Control Message Protocol, Darpa Internet Program, Protocol Specfication, Sep. 1981.
Transmission Control Protocol, Darpa Internet Program, Protocol Specification, Sep. 1981.
Internet Standards Archive, Oct. 1989.
V,. Jacobsen, TCP Extensions for Long–Delay Paths, Oct. 1989.
J. Postel, The TCP Maximum Segment Size and Related Topics, Nov. 1983.

* cited by examiner

Primary Examiner—Alpus H. Hsu
Assistant Examiner—Afsar M. Qureshi
(74) Attorney, Agent, or Firm—Michael A. Glenn

(57) ABSTRACT

A resegmentation entity implements a TCP resegmentation technique wherein a receiving host receives packets that appear as if it they have been transmitted specifically for the receiving host's MTU. The receiving host does not require the buffering and CPU utilization necessary for IP reassembly. Thus, the receiving host has a lower latency when receiving IP datagrams that contain resegmented TCP segments than it would if it needed to re-assemble an IP datagram from fragments before it could process the TCP segment. Further, the sending host transmits TCP segments at its largest MTU, without regard to the receiving station's MTU, knowing that the intermediate routing entity insures that TCP resegmentation occurs. In the event that an IP datagram containing a resegmented TCP segment is lost, the sending host only has to retransmit the actual TCP data that was lost, and not the complete TCP segment.

24 Claims, 3 Drawing Sheets

TCP RESEGMENTATION

BACKGROUND OF THE INVENTION

1. Technical Field

The invention relates to electronic networks. More particularly, the invention relates to establishing and maintaining efficient communication between two IP hosts that have differing MTUs and that primarily use TCP as their transport protocol.

2. Description of the Prior Art

When an IP (Internet Protocol) routing entity has interfaces with differing MTUs (Maximum Transmission Unit) and a large IP packet containing a TCP (Transmission Control Protocol) segment must be forwarded from an interface having a smaller MTU, the routing entity typically does one of two things:

Fragment the packet using IP fragmentation; or

Drop the packet and send an ICMP (Internet Control Message Protocol) DESTINATION UNREACHABLE; FRAGMENTATION NEEDED message back to the sending host.

IP fragmentation breaks the large IP packet into several smaller IP fragments which require reassembly by the receiving host. Dropping the packet causes the data to be lost, and sending an ICMP DESTINATION UNREACHABLE; FRAGMENTATION NEEDED message back to the host causes the host to reduce its path MTU and use smaller IP packets.

IP fragmentation places the burden of reassembling the IP fragments onto the receiving host. When a host receives IP fragments, it must fully reassemble all of the fragments to form a complete IP packet before it can deliver the payload to TCP. This requires additional buffer and CPU resources at the receiving host and increases the latency of receiving a TCP segment. Additionally, if any of the fragments are dropped or otherwise lost during transit, the entire original TCP segment must be retransmitted.

Dropping the IP packet and sending an ICMP DESTINATION UNREACHABLE—FRAGMENTATION NEEDED message back to the sending host causes the host's path MTU discovery algorithm to choose a smaller MTU for the path and use that smaller MTU for future transmissions. When this occurs, it forces a host that is capable of using a larger MTU to use a smaller MTU, reducing the host's efficiency. It also requires the entire TCP segment to be retransmitted.

It would be advantageous to allow a host that is capable of sending large IP packets to do so, even when it is communicating over a path that is not capable of carrying large IP packets. It would also be advantageous not to burden the receiving host with the task of reassembling the IP packet from the various IP fragments. Finally, it would be advantageous to enable this ability without requiring all of the connected stations in the network to use the smallest MTU of any interface along the path that a packet takes as it traverses the network.

SUMMARY OF THE INVENTION

The invention provides a resegmentation entity that implements a TCP resegmentation technique wherein a receiving host receives packets that appear as if it they have been transmitted specifically for the receiving host's MTU. The receiving host does not require the buffering and CPU utilization necessary for IP reassembly. Also, the receiving host has a lower latency when receiving IP datagrams that contain resegmented TCP segments than it would if it needed to re-assemble an IP datagram from fragments before it could process the TCP segment. Further, the sending host transmits TCP segments at its largest MTU, without regard to the receiving station's MTU, knowing that the intermediate routing entity insures that TCP resegmentation occurs. In the event that an IP datagram containing a re-segmented TCP segment is lost, the sending host only has to retransmit the actual TCP data that was lost, and not the complete TCP segment.

DETAILED DESCRIPTION OF THE INVENTION

The invention provides a resegmentation entity that implements a novel TCP resegmentation technique wherein a receiving host receives packets that appear as if it they have been transmitted specifically for the receiving host's MTU. The receiving host does not require the buffering and CPU utilization necessary for IP reassembly. Also, the receiving host has a lower latency when receiving IP datagram that contain resegmented TCP segments than it would if it needed to reassemble an IP datagram from fragments before it could process the TCP segment. Further, the sending host transmits TCP segments at its local MTU, without regard to the receiving station's MTU. In the event that an IP datagram containing a resegmented TCP segment is lost, the sending host only has to retransmit the actual TCP data that was lost, and not the complete TCP segment.

Figure 1:
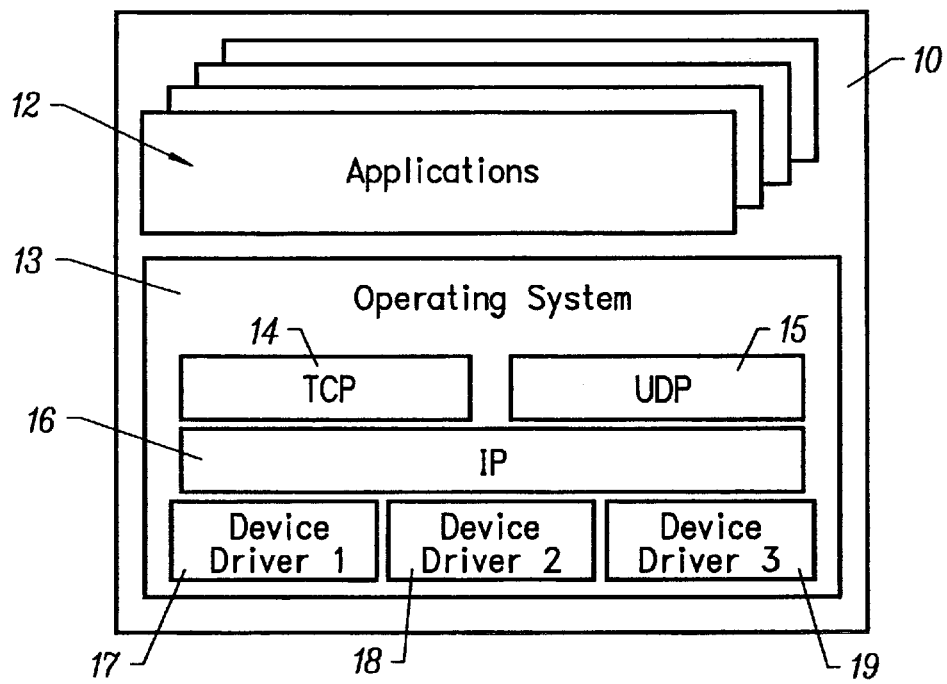
FIG. 1 is a block schematic diagram showing a host protocol stack.

FIG. 1 is a block schematic diagram showing a system that provides a host protocol stack. As shown in FIG. 1, a system 10 includes one or more applications 12, an operating system 13, a TCP protocol entity 14, a UDP (User Datagram Protocol) protocol entity 15, an IP protocol entity 16, and one or more network device drivers 17, 18, 19. The invention is readily applied to any system, such as that shown in FIG. 1. The host may be either a receiving host or a transmitting host. A unique aspect of the invention is that the MTU size of the host is irrelevant for both transmitting and receiving purposes. Therefore, a heterogeneous enterprise having many disparate systems and networks may be provided without degrading system performance or encumbering a host with special adaptations to allow enterprise wide communication.

Figure 2:
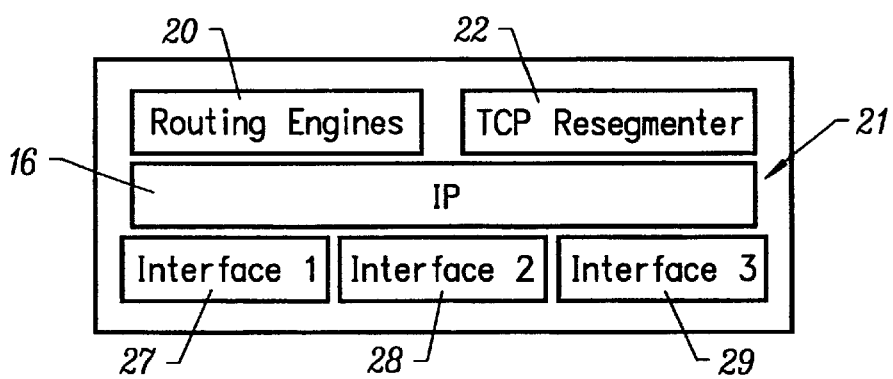
FIG. 2 is a block schematic diagram showing a resegmenting entity according to the invention.

FIG. 2 is a block schematic diagram showing a resegmenting entity, in the form of a router 21, according to the invention. The resegmenting entity also includes a forwarding engine 20, a TCP resegmenter 22, an IP protocol entity 16, and one or more network interfaces 27, 28, 29. The resegmenting entity is shown herein within a router for purposes of example only. Such entity may be included in any network elements, e.g. a router, bridge, switch, or a sending host's driver or network interface.

Figure 3:
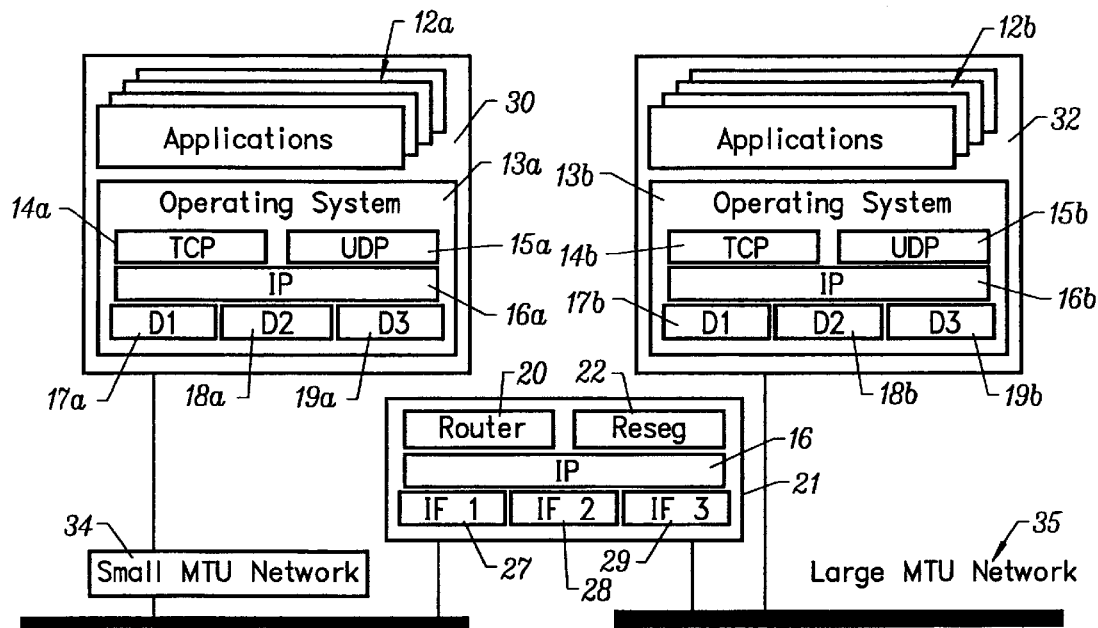
FIG. 3 is a block schematic diagram showing host communications according to the invention.

FIG. 3 is a block schematic diagram showing host communications according to the invention. In FIG. 3, a first system 30 resides on a small MTU network 34 and a second system 32 resides on a large MTU network 35. Systems located on the two networks are able to exchange information via a router 21 which comprises the resegmenting entity of FIG. 2.

Figure 4:
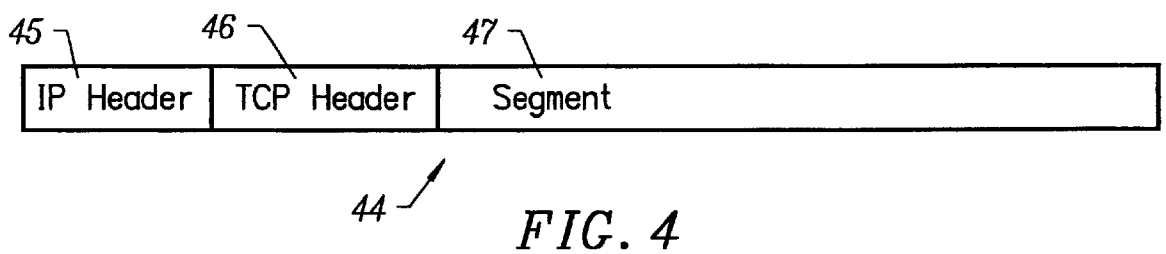
FIG. 4 is a schematic representation of a TCP/IP packet.

FIG. 4 is a schematic representation of an TCP/IP packet 44 which includes an IP header 45, a TCP header 46, and TCP data 47. Instead of relying only on IP fragmentation, or the avoidance of IP fragmentation as in the prior art, the invention provides a system that uses a combination of IP fragmentation and TCP resegmentation. This allows IP and TCP protocol entities to take advantage of the increase in efficiency that results from using larger MTUs, without requiring that all connected networks and hosts support large MTUs.

Thus, the invention provides a mechanism referred to as TCP resegmentation, (which takes a single TCP segment and breaks it into multiple TCP segments) called subsegments. This resegmentation occurs at an intermediate hop by a network element (router, bridge, switch) or in the sending host's driver or network interface.

Figure 5:
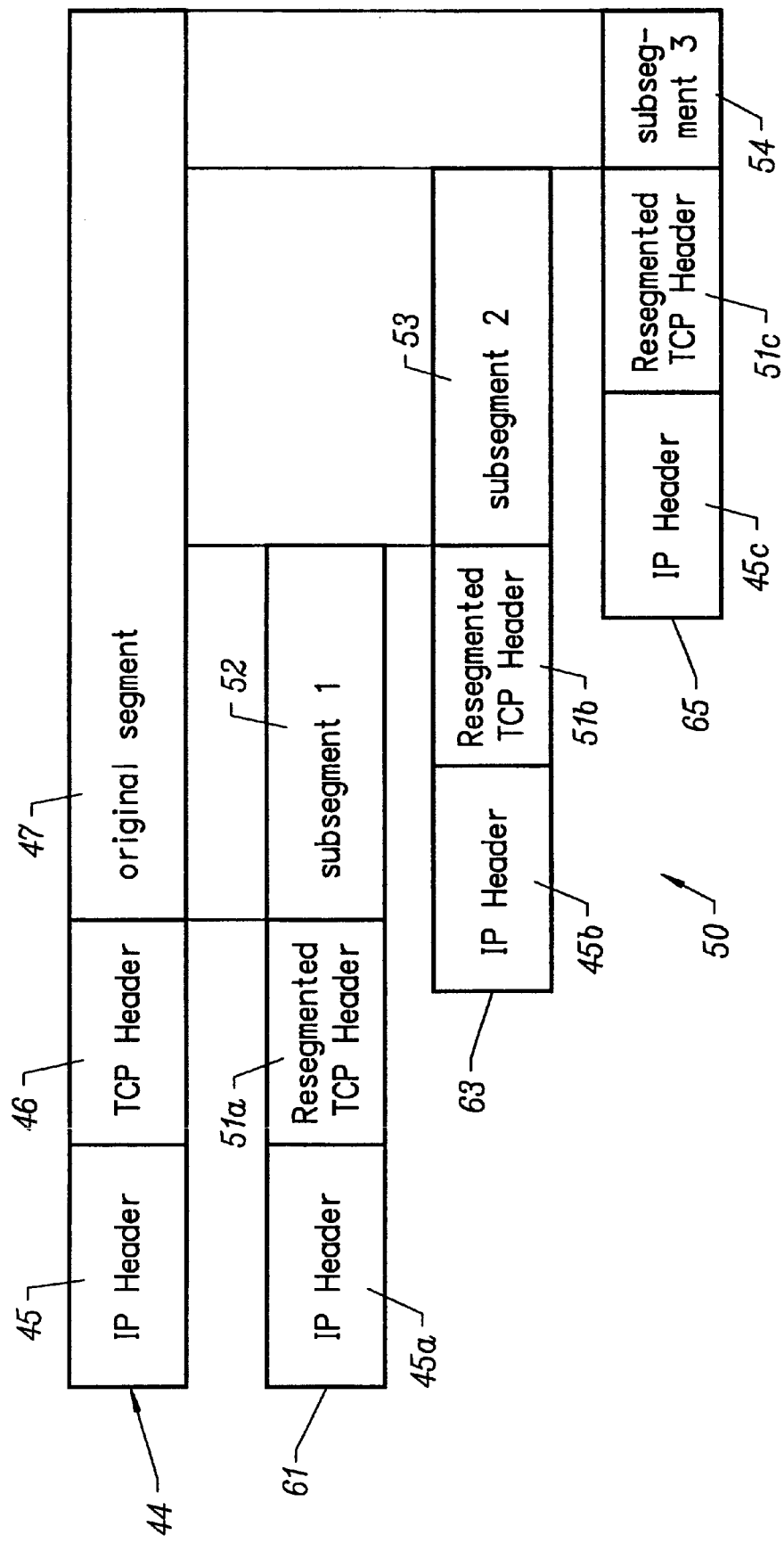
FIG. 5 is a schematic representation of a resegmented packet according to the invention.

FIG. 5 is a schematic representation of a resegmented packet according to the invention. Thus, the original segment 47 in the original IP datagram 44 (shown in FIG. 4) is broken up in multiple subsegments 52, 53, 54, each of which is contained in a complete IP datagram 61, 63, 65, each including an IP header 45a, 45b, 45c and a resegmented TCP header 51a, 51b, 51c. The resegmentation is actually performed in accordance with the TCP resegmentation.

Figure 6:
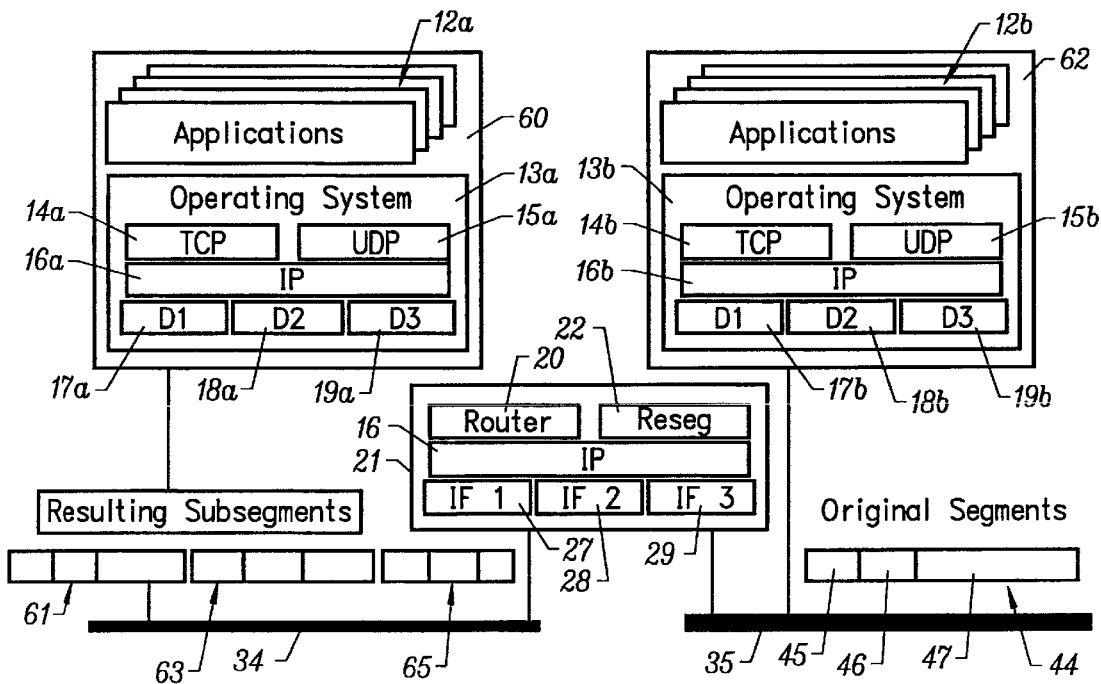
FIG. 6 is a block schematic diagram showing resegmentation in an electronic network according to the invention.

FIG. 6 is a block schematic diagram showing resegmentation in an electronic network according to the invention. In the preferred embodiment of the invention, TCP resegmentation operates as follows:

When an IP routing, bridging, switching entity 21 has network interfaces 27, 28, 29 with differing MTUs and a large IP datagram 44 from a transmitting station 62 must be forwarded out an interface 27 having a smaller MTU, where the IP datagram contains a complete TCP segment, the packet is resegmented into multiple, smaller TCP subsegments 61, 63, 65 in accordance with the TCP resegmenting algorithm. This allows the receiving station 60 to process each of the TCP subsegments independently, without consuming additional buffer or CPU resources on the receiving station for IP reassembly.

If a TCP subsegment is lost, the sending host 62 needs to only retransmit the TCP data that was lost, not the complete TCP segment, because all bytes in a TCP stream are numbered and acknowledged individually.

TCP resegmentation ignores and may change the setting of the IP DON'T FRAGMENT bit. Accordingly, MTU discovery algorithms may fail by reporting that the largest MTU that works is the MTU of the local interface, and not necessarily the smallest MTU that can be used by every link in the path.

TCP resegmentation requires that the resegmenting entity perform IP fragmentation on packets which contain transport protocols other than TCP and on TCP packets that do not meet the criteria for resegmentation.

TCP resegmentation is a processor intensive operation because it requires the generation of a new TCP checksum on each new segment. Because of this, it is preferred, but not required that TCP resegmentation be performed with hardware assistance whenever possible.

The originator of the segmented packet may receive partial ACKs of the segment as it is received in pieces. Although this is permissible in the TCP protocol definition, some TCP protocol implementations may not deal with this correctly.

The following is a pseudocode example of an algorithm that resegments TCP segments that have not been fragmented and that do not contain any IP or TCP options. It does not decrement the IP TTL field and it ignores the IP DON'T FRAGMENT bit. It also turns off the IP DON'T FRAGMENT bit for any packets on which it is unable to perform TCP resegmentation, and it turns on the IP DON'T FRAGMENT bit for all resegmented packets.

ALGORITHM

IF the received packet is IP AND
the IP length exceeds the MTU AND
no IP options are present AND
the IP datagram has not already been fragmented AND
the protocol is TCP AND
no TCP options are present THEN
    set the remaining data length to the original data length
    set the current data pointer to the original data pointer
    set the new urgent pointer to the original urgent pointer
    set the current sequence number to the original sequence number
WHILE the remaining data length is non-zero DO
allocate a new transmit buffer for the new segment
set the new segment length to the minimum of the length of the remaining data and the egress MSS
copy the original IP and TCP headers to the new transmit buffer
IF the TCP SYN bit is set AND
this is not the first subsegment THEN
turn off the TCP SYN bit
IF the TCP FIN bit is set AND
this is not the last subsegment THEN
turn off the TCP FIN bit
IF the TCP PUSH bit is set AND
this is not the last subsegment THEN
turn off the TCP PUSH bit
IF the TCP URG bit is set AND
the new urgent pointer is non-zero THEN
set the urgent pointer to the new urgent pointer
IF the new urgent pointer points to within the subsegment THEN
set the new urgent pointer to zero
ELSE
decrement the new urgent pointer by the subsegment length
ELSE
turn off the TCP URG bit
set the urgent pointer to zero
set the TCP sequence number to the current sequence number
increment the current sequence number by the subsegment length
set the IP datagram length to the new IP datagram length
turn on the IP DONT FRAGMENT bit
decrement the remaining data length by the subsegment length
copy the data from the current data pointer to the data portion of the new transmit buffer for the length of the subsegment increment the current data pointer by the subsegment
  length
recalculate the TCP checksum
recalculate the IP checksum
send the new segment
ENDWHILE
free the original data buffer
ELSE
turn off the IP DONT FRAGMENT bit Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An apparatus for exchanging information packets between two or more hosts over an electronic network, wherein at least one of said hosts transmits and receives information packets that differ in size from those of the other of said two or more hosts, comprising:

a resegmentation entity located within either of said one or more of said hosts or their respective network interfaces or within said electronic network, for resegmenting larger information segments within said information packets into a plurality of smaller subsegments within a plurality of corresponding information subpackets wherein a receiving host receives information packets that are of a size wherein said information packets appear as if they have been transmitted specifically for said receiving host, wherein said information packets are independently processable without IP reassembly required, and wherein each of said received information packets is an IP datagram which includes an IP header, a resegmented TCP header, and resegmented TCP data.

2. The apparatus of claim 1, wherein a sending host transmits information packets without regard to a receiving hosts requirements with regard to information packet size.

3. The apparatus of claim 1, wherein said resegmentation entity is an intermediate forwarding entity.

4. The apparatus of claim 1, wherein a sending host only has to retransmit a data subsegment that was lost, and not a complete segment in the event that an IP datagram containing a subsegment is lost.

5. The apparatus of claim 1, wherein each of said hosts is an IP host, and wherein each of said hosts use TCP as a transport protocol.

6. The apparatus of claim 1, wherein at least one of said hosts comprises a system that includes one or more applications, an operating system, a TCP protocol entity, an IP protocol entity, and one or more network device drivers.

7. The apparatus of claim 1, wherein the size of an MTU used by each said host is irrelevant for both transmitting and receiving purposes and, therefore, a heterogeneous enterprise having many disparate systems and networks may be provided without degrading system performance or encumbering a host with special adaptations to allow enterprise wide communication.

8. The apparatus of claim 1, wherein said resegmenting entity comprises a forwarding engine, a TCP resegmenter, an IP layer, and one or more network interfaces.

9. The apparatus of claim 1, wherein said resegmenting entity is any of a router, bridge, switch, or a sending host's driver or network interface.

10. The apparatus of claim 1, wherein said original information packet is an IP datagram which includes an IP header, a TCP header, and TCP data.

11. The apparatus of claim 1, wherein said resegmenting entity performs IP fragmentation on information packets which contain transport protocols other than TCP.

12. A resegmentation entity for exchanging information packets between two or more hosts over an electronic network, wherein at least one of said hosts transmits and receives information packets that differ in size from those of the other of said two or more hosts, said resegmentation entity comprising:

a resegmentor, located within either of one or more of said hosts or network interfaces or within said electronic network and apart from said hosts, for resegmenting larger information segments within said information packets into a plurality of smaller subsegments within a plurality of corresponding information subpackets, wherein each of said received information subpackets is an IP datagram which includes an IP header, a resegmented TCP header, and resegmented TCP data, and wherein said information packets are independently processable without IP reassembly required.

13. A method for exchanging information packets between two or more hosts over an electronic network, wherein at least one of said hosts transmits and receives information packets that differ in size from those of the other of said two or more hosts, said method comprising the steps of:

resegmenting larger information segments within said information packets into a plurality of smaller subsegments within a plurality of corresponding information subpackets; and forwarding said information subpackets to a receiving host wherein said receiving host receives information packets that are of a size wherein said information packets appear as if it they have been transmitted specifically for said receiving host, wherein said information packets are independently processable without IP reassembly required, and wherein each of said received information packets is an IP datagram which includes an IP header, a resegmented TCP header, and resegmented TCP data.

14. The method of claim 13, wherein a sending host transmits information packets without regard to a receiving hosts requirements with regard to information packet size.

15. The method of claim 13, wherein said resegmenting step is implemented by a resegmentation entity comprising an intermediate forwarding entity.

16. The method of claim 15, wherein said resegmenting entity comprises a forwarding engine, a TCP resegmenter, an IP protocol entity, and one or more network interfaces.

17. The method of claim 15, wherein said resegmenting entity is any of a router, bridge or switch, or a sending host's driver or network interface.

18. The method of claim 15, wherein said resegmenting entity performs IP fragmentation on information packets which contain transport protocols other than TCP.

19. The method of claim 13, wherein a sending host only has to restransmit the TCP data that was lost, and not a complete segment in the event that a packet containing a resegmented segment is lost.

20. The method of claim 13, wherein each of said hosts is an IP host, and wherein each of said hosts use TCP as a transport protocol.

21. The method of claim 13, wherein at least one of said hosts comprises a system that includes one or more applications, an operating system, a TCP protocol entity, an IP protocol entity, and one or more network device drivers.

22. The method of claim 13, wherein the MTU of each said host is irrelevant for both transmitting and receiving purposes and, therefore, a heterogeneous enterprise having many disparate systems and networks may be provided without degrading system performance or encumbering a host with special adaptations to allow enterprise wide communication.

23. The method of claim 13, wherein said information packet is an IP datagram which includes an IP header, a TCP header, and TCP data.

24. A resegmentation method for exchanging information packets between two or more hosts over an electronic network, wherein at least one of said hosts transmits and receives information packets that differ in size from those of the other of said two or more hosts, said resegmentation method comprising the steps of:

providing a resegmenter located either of within said electronic network and apart from said hosts or within said hosts or network interfaces; and resegmenting larger information segments within said information packets into a plurality of smaller subsegments within a plurality of corresponding information subpackets, wherein each of said received information subpackets is an IP datagram which includes an IP header, a resegmented TCP header, and resegmented TCP data, and wherein said information subpackets are independently processable without IP reassembly required.

* * * * *